(12) United States Patent
Zhang

(10) Patent No.: US 9,350,621 B2
(45) Date of Patent: May 24, 2016

(54) SYNCHRONIZATION AFTER RESTART OF A FC SWITCH

(71) Applicant: Hangzhou H3C Technologies Co., Ltd., Hangzhou (CN)

(72) Inventor: Changjun Zhang, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 0 days.

(21) Appl. No.: 14/391,353

(22) PCT Filed: May 8, 2013

(86) PCT No.: PCT/CN2013/075307
§ 371 (c)(1),
(2) Date: Jan. 14, 2015

(87) PCT Pub. No.: WO2013/185513
PCT Pub. Date: Dec. 19, 2013

(65) Prior Publication Data
US 2015/0131474 A1  May 14, 2015

(30) Foreign Application Priority Data

Jun. 11, 2012 (CN) .......................... 2012 1 0195441

(51) Int. Cl.
*H04L 12/28* (2006.01)
*H04L 12/24* (2006.01)
(Continued)

(52) U.S. Cl.
CPC .............. *H04L 41/12* (2013.01); *H04L 45/026* (2013.01); *H04L 49/357* (2013.01)

(58) Field of Classification Search
CPC ....... H04L 41/12; H04L 45/02; H04L 45/026; H04L 49/357
See application file for complete search history.

(56) References Cited

U.S. PATENT DOCUMENTS

| | | | |
|---|---|---|---|
| 7,359,377 B1* | 4/2008 | Kompella | H04L 45/50 370/254 |
| 7,447,198 B1 | 11/2008 | Banks et al. | |
| 8,799,422 B1* | 8/2014 | Qu | H04L 45/00 709/220 |
| 2005/0257002 A1 | 11/2005 | Nguyen | |
| 2007/0127396 A1* | 6/2007 | Jain | H04L 45/02 370/254 |
| 2011/0134802 A1 | 6/2011 | Rajagopalan et al. | |

FOREIGN PATENT DOCUMENTS

| | | |
|---|---|---|
| CN | 101136730 | 3/2008 |
| CN | 101505277 | 8/2009 |

(Continued)

OTHER PUBLICATIONS

Extended European Search Report dated Nov. 17, 2015, EP Patent Application No. 13803884.9 dated May 8, 2013, European Patent Office.

(Continued)

*Primary Examiner* — Lonnie Sweet
(74) *Attorney, Agent, or Firm* — Hewlett Packard Enterprise Patent Department

(57) ABSTRACT

Examples of the present disclosure provide a method and an apparatus for synchronization after restart of a FC switch. For example, when a FC switch which is restarted detects that a neighbor FC switch has already established an adjacency relationship with the restarted FC switch, the adjacency relationship between the restarted FC switch and the neighbor FC switch is maintained, and the neighbor FC switch is requested to perform LSR initial synchronization to the restarted FC switch under a circumstance that the adjacency relationship is kept.

11 Claims, 7 Drawing Sheets

(51) Int. Cl.
*H04L 12/931* (2013.01)
*H04L 12/751* (2013.01)

(56) References Cited

FOREIGN PATENT DOCUMENTS

| CN | 101984600 | 3/2011 |
|---|---|---|
| CN | 102223304 | 10/2011 |
| CN | 102487357 | 6/2012 |
| CN | 102694735 | 9/2012 |

OTHER PUBLICATIONS

Shand, et al., "Restart Signaling for IS-IS", Cisco Systems, Oct. 2008, 22 pages, Geneva, Switzerland.
CN First Office Action dated Jun. 26, 2014, CN Patent Application No. 201210195441.2 dated Jun. 11, 2012, The State Intellectual Property Office, P.R. China.
International Search Report and Written Opinion dated Aug. 15, 2013 issued on PCT Patent Application No. PCT/CN2013/075307 dated May 8, 2013, The State Intellectual Property Office, P.R. China.

* cited by examiner

SYNCHRONIZATION AFTER RESTART OF A FC SWITCH

CLAIM FOR PRIORITY

The present application is a national stage filing under 35 U.S.C 371 of PCT application number PCT/CN2013/075307, having an international filing date of May 8, 2013, which claims priority to Chinese patent application number 201210195441.2 having a filing date of Jun. 11, 2012, the disclosures of which are hereby incorporated by reference in their entireties.

BACKGROUND

Fabric Shortest Path First (FSPF) protocol is a link-based dynamic routing discovery protocol and is used in a Fiber Channel (FC) network. Each FC switch supporting the FSPF protocol can use a Link State Record (LSR) generated by the FC switch itself to describe a relationship between the FC switch and a neighbor FC switch. The FC switch and the neighbor FC switch mutually synchronize the LSR through a Link State Update (LSU) packet and a Link State Acknowledgement (LSA) packet of a Switch Fabric Internal Link Service (SW_ILS) protocol, so that each FC switch can detect the topology of the FC network through the relationship described by the LSR, and then routing is achieved based on the detected topology.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
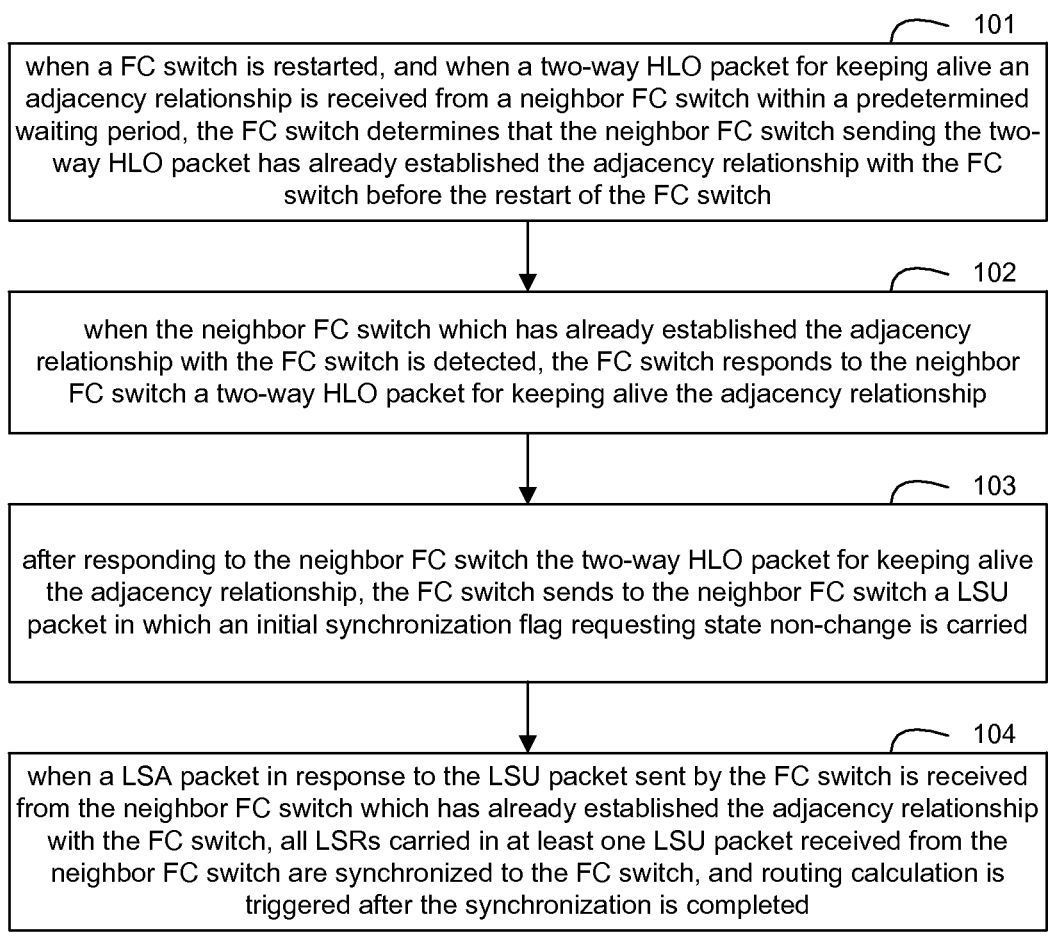
FIG. 1 is a flowchart illustrating a method for synchronization after restart of a FC switch according to an example of the present disclosure.

Hereinafter, the present disclosure will be described in further detail with reference to the accompanying drawings and examples.

In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, and the term "including" means including but not limited to. The term "based on" means based at least in part on. In addition, the terms "a" and "an" are intended to denote at least one of a particular element.

Generally, after a FC switch and a neighbor FC of the FC switch discover each other, LSR initial synchronization may be performed, and all LSRs in a Link-State Database (LSDB) of the other side are synchronized to a local LSDB during the process of the initial synchronization.

After the FC switch and the neighbor FC switch complete the initial synchronization, an adjacency relationship is established between the two FC switches. Each of the two FC switches may calculate the shortest routing from local to any one of other FC switches based on the synchronized LSR in the local LSDB, so that each FC switch can achieve the routing forwarding of the FSPF protocol through a neighbor FC switch which establishes the adjacency relationship with the FC switch.

After the FC switch and the neighbor FC switch establish the adjacency relationship between each other, if the network topology is changed, the two FC switches may perform topology updating synchronization under the circumstance that the adjacency relationship is kept, and mutually synchronize respective LSRs relating to the topology change during the process of the topology updating synchronization; after the FC switch and the neighbor FC switch establish the adjacency relationship between each other, if a corresponding port of one of the FC switches is pulled out or the FC switch is restarted, the FC switch re-initiates a neighbor discovery process between the FC switch and the neighbor FC switch, so that the established adjacency relationship between the two FC switches is deleted, and a new adjacency relationship is re-established after the re-initiated neighbor discovery and the initial synchronization is completed.

The above working principles of the FC switch leads to changes of the routing in the FC network due to the restart of the FC switch; however, in some circumstances, it is necessary to ensure that the routing does not change after the restart of the FC switch.

Generally, routing associated with a restarted FC switch in a FC network includes two parts as follows: one part is routing from another FC switch in the FC network to the restarted FC switch; and another part is routing from the restarted FC switch to the other FC switch in the FC network.

Therefore, in order to ensure that the routing associated with the restarted FC switch in the FC network is not changed before and after the restart of the restarted FC switch, examples of the present disclosure employ different approaches for processing the above two parts of routing.

Firstly, in order to ensure that the routing from the other FC switch in the FC network to the restarted FC switch is not changed before and after the restart of the restarted FC switch:

the restarted FC switch determines, within a predetermined waiting period after the restart, whether there is a neighbor FC switch which has already established an adjacency relationship with the restarted FC switch before the restart of the restarted FC switch rather than immediately re-initiates a neighbor discovery process with a neighbor FC switch;

if it is determined that there is not the neighbor FC switch which has already established the adjacency relationship with the restarted FC switch before the restart of the restarted FC switch, the neighbor discovery process with the neighbor FC switch is re-initiated;

if it is determined that there is the neighbor FC switch which has already established the adjacency relationship with the restarted FC switch before the restart of the restarted FC switch, the neighbor discovery process with the neighbor FC switch is not re-initiated, the adjacency relationship between the restarted FC switch and the neighbor FC switch is maintained immediately, and the neighbor FC switch is requested to perform LSR initial synchronization to the restarted FC switch under a circumstance that the adjacency relationship is kept.

In this way, state rollback occurring in the neighbor FC switch can be avoided and deletion of the adjacency relationship between the neighbor FC switch and the restarted FC switch can be avoided. Therefore, the routing from the other FC switch in the FC network to the restarted FC switch through the neighbor FC switch being deleted can be avoided, so that the routing from the other FC switch in the FC network to the restarted FC switch is not changed before and after the restart of the restarted FC switch.

Secondly, in order to ensure that the routing from the restarted FC switch to the other FC switch in the FC network is not changed before and after the restart of the restarted FC switch:

as LSRs in the restarted FC switch before the restart are the same with LSRs in the neighbor FC switch, and the LSRs in the neighbor FC switch where the state rollback does not occur is not changed, the restarted FC switch is able to detect the same LSRs as ones before the restart of the restarted FC switch through the initial synchronization with the neighbor FC switch which has already established the adjacency relationship with the restarted FC switch.

In this way, the routing from the restarted FC switch to the other FC switch in the FC network which is re-calculated by the restarted FC switch is the same as one before the restart of the restarted FC switch; moreover, the restarted FC switch triggers routing calculation after the initial synchronization with the neighbor FC switch which has already established the adjacency relationship with the restarted FC switch is completed rather than performs the routing calculation during the process of the initial synchronization. Therefore, frequent changing of the routing from the restarted FC switch to the other FC switch in the FC network which is re-calculated by the restarted FC switch following the process of the initial synchronization can be avoided. In this way, a change in the routing in the FC network due to the restart of the FC switch can be avoided.

The restart described in examples of the present disclosure can be not only the restart triggered by a master-backup switch in a FC switch with a distributed structure, but also the restart resulting from a variety of reasons such as a restart occurring in a FSPF protocol layer, and a restart initiated by a FC switch for re-synchronizing (e.g., the total checksum of a local LSDB is inconsistent with the checksum of all LSRs). Based on the above principles, an example of the present disclosure proposes a method for synchronization after restart of a FC switch.

FIG. 1 is a flowchart illustrating a method for synchronization after restart of a FC switch according to an example of the present disclosure. As shown in FIG. 1, when the FC switch is restarted, the method is performed by the restarted FC switch. The process of the method includes operations as follows.

In block 101, when the FC switch is restarted, and when a packet for keeping alive an adjacency relationship, e.g., a two-way Hello (HLO) packet, is received from a neighbor FC switch within a predetermined waiting period, the FC switch determines that the neighbor FC switch sending the two-way HLO packet has already established the adjacency relationship with the FC switch before the restart of the FC switch, and performs block 102.

If the FC switch does not receive from the neighbor FC switch the two-way HLO packet for keeping alive the adjacency relationship within the predetermined waiting period (i.e., a timer for keeping alive the adjacency relationship is expired), it is determined and may be indicated that there is not a neighbor FC switch which has already established the adjacency relationship with the FC switch before the restart of the FC switch, so that the process is terminated, the adjacency relationship between the FC switch and the neighbor FC switch is deleted, and a neighbor discovery process is re-performed with the neighbor FC switch;

if the FC switch receives from the neighbor FC switch a packet for neighbor discovery within the predetermined waiting period (i.e., before the expiration of the timer for keeping alive the adjacency relationship), i.e., the neighbor discovery initiated by the neighbor FC switch is detected, it is indicated that the neighbor FC switch does not establish the adjacency relationship with the FC switch before the restart of the FC switch, or, the adjacency relationship is deleted at this time although the neighbor FC switch has established the adjacency relationship with the FC switch before the restart of the FC switch, so that the process is terminated, the adjacency relationship between the FC switch and the neighbor FC switch is deleted, and the neighbor discovery is re-performed with the neighbor FC switch.

In block 102, when the neighbor FC switch which has already established the adjacency relationship with the FC switch is detected, the FC switch responds to the neighbor FC switch with a packet for keeping alive the adjacency relationship, e.g., a two-way HLO packet.

In block 103, after responding to the neighbor FC switch the two-way HLO packet for keeping alive the adjacency relationship, the FC switch sends to the neighbor FC switch a LSU packet in which an initial synchronization flag requesting state non-change is carried to request the neighbor FC switch to keep the adjacency relationship with the FC switch as well as to perform LSR initial synchronization to the FC switch.

In block 104, when a LSA packet in response to the LSU packet sent by the FC switch and carrying the initial synchronization flag requesting state non-change is received from the neighbor FC switch which has already established the adjacency relationship with the FC switch, all LSRs carried in at least one LSU packet for LSR synchronization received from the neighbor FC switch are synchronized to the FC switch, and routing calculation is triggered after the synchronization is completed.

So far, a synchronization process for the restarted FC switch is completed.

Figure 2:
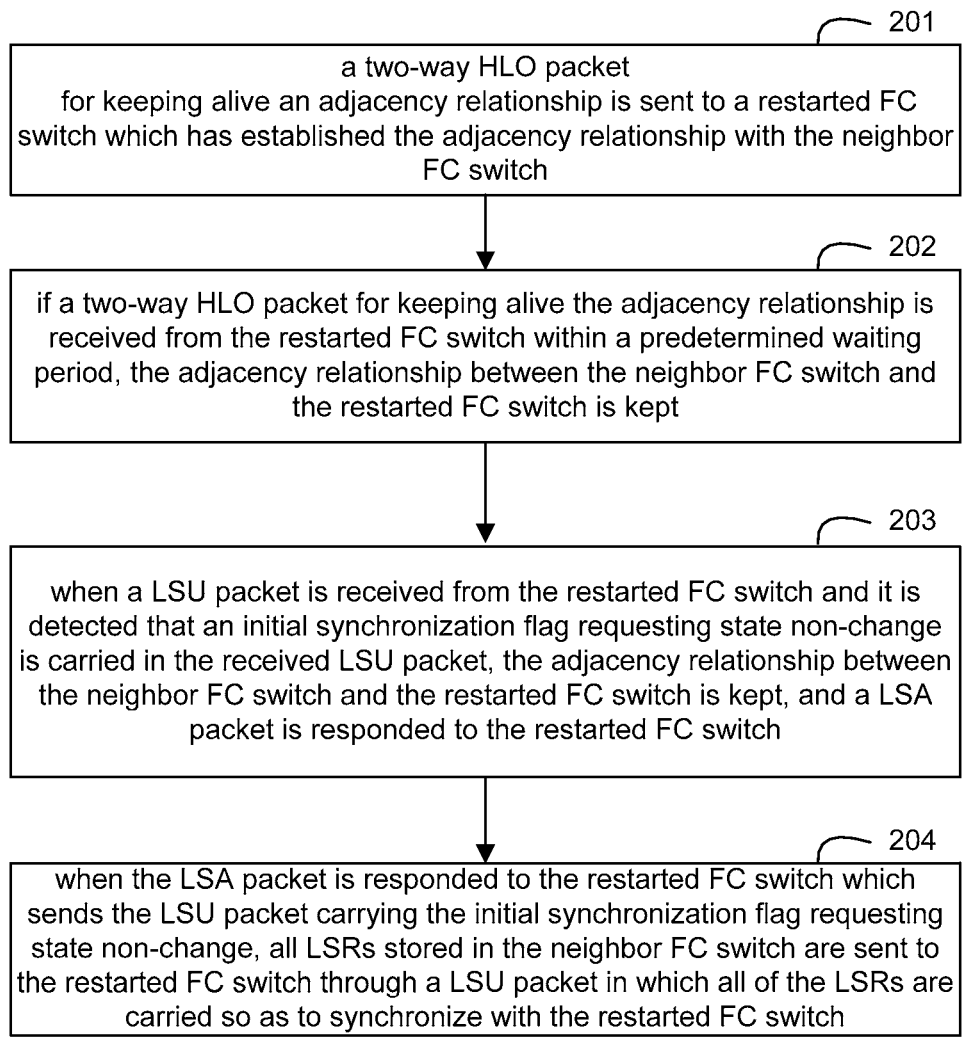
FIG. 2 is a flowchart illustrating a method for synchronization after restart of a FC switch according to another example of the present disclosure.

FIG. 2 is a flowchart illustrating a method for synchronization after restart of a FC switch according to another example of the present disclosure. As shown in FIG. 2, when the FC switch is restarted, the method is performed by a neighbor FC switch of the restarted FC switch. The restarted FC switch has already established an adjacency relationship with the neighbor FC switch before the restart. The method includes operations as follows.

In block 201, a packet for keeping alive the adjacency relationship is sent to the restarted FC switch, e.g., a two-way HLO packet.

In block 202, if a two-way HLO packet used for keeping alive the adjacency relationship and responded from the restarted FC switch is received within a predetermined waiting period, the adjacency relationship between the neighbor FC switch and the restarted FC switch is kept.

If the two-way HLO packet for keeping alive the adjacency relationship is not received from the restarted FC switch within the predetermined waiting period (i.e., a timer for keeping alive the adjacency relationship is expired), or, the neighbor FC switch receives from the restarted FC a packet for neighbor discovery within the predetermined waiting period (i.e., before the expiration of the timer for keeping alive the adjacency), i.e., the neighbor discovery initiated by the restarted FC switch is detected, so that the process is terminated, the adjacency relationship between the neighbor FC switch and the restarted FC switch is deleted, and the neighbor discovery is re-performed with the restarted FC switch.

In block 203, when a LSU packet is received from the restarted FC switch and it is detected that an initial synchronization flag requesting state non-change is carried in the received LSU packet, the adjacency relationship between the neighbor FC switch and the restarted FC switch is kept, and a LSA packet is responded to the restarted FC switch.

In block 204, when the LSA packet is responded to the restarted FC switch which sends the LSU packet carrying the initial synchronization flag requesting state non-change, all LSRs stored in the neighbor FC switch are sent to the restarted FC switch through at least one LSU packet in which all of the LSRs are carried so as to synchronize with the restarted FC switch. So far, a synchronization process for the neighbor FC switch of the restarted FC switch is completed.

As can be seen from the above description, in the methods shown in FIG. 1 and FIG. 2 in accordance with examples of the present disclosure, an initial synchronization request for keeping an adjacency relationship is implemented through carrying an initial synchronization flag requesting state non-change in a LSU packet. In order to carry the flag in the LSU packet, a Flag field in the LSU packet is improved in accordance with an example of the present disclosure.

Specifically, there is a 1-byte Flag field in the LSU packet. Only two bits in the Flag field are used, i.e., a synchronization type flag in bit 0 and a synchronization completion flag in bit 1, while the remaining 6 bits are all free, therefore, an example of the present disclosure configures one of the six free bits (e.g., bit 3) as a state non-change synchronization request flag.

As such, in the Flag field of the LSU packet sent in block 103 and used to initiate the initial synchronization request for keeping the adjacency relationship as well as the LSU packet received in block 203 and used to initiate the initial synchronization request for keeping the adjacency relationship, the state non-change synchronization request flag is configured as a valid value 1, and the synchronization type flag is configured as a type value 1 which denotes initial synchronization.

While in the Flag field of the LSU packet received in block 104 and used to transmit LSRs normally as well as the LSU packet sent in block 204 and used to transmit the LSRs normally, the state non-change synchronization request flag is configured as an invalid value 0, and the synchronization type flag is configured as the type value 1 which denotes initial synchronization.

In addition, as the LSU packet sent in block 103 is mainly used to initiate the initial synchronization request for keeping the adjacency relationship rather than synchronize LSRs of the restarted FC switch to the neighbor FC switch which has already established the adjacency relationship with the restarted FC switch, thus it is not necessary for the neighbor FC switch to determine whether the restarted FC switch completes the LSR transmission; as a result, in the LSU packet sent in block 103 and carrying the initial synchronization flag requesting state non-change, the synchronization completion flag of the Flag field may be preferably configured as the valid value 1 which denotes that the FC switch has completed the LSR transmission; this is also applicable to the Flag field in the LSU packet received in block 203 and carrying the initial synchronization flag requesting state non-change.

While for the LSU packet received in block 104 and used for LSR synchronization, and the LSU packet sent in block 204 and used for LSR synchronization, as these LSU packets are mainly used to transmit LSRs normally, therefore, the synchronization completion flag of the Flag field in the above LSU packets may be configured as follows.

For block 104:

if all of LSRs stored in the neighbor FC switch which has already established the adjacency relationship with the restarted FC switch are carried in one LSU packet, the synchronization completion flag of the Flag field in the one LSU packet received in block 104 is configured as the valid value 1;

if all of the LSRs stored in the neighbor FC switch which has already established the adjacency relationship with the restarted FC switch are carried in a plurality of LSU packets, the synchronization completion flag of the Flag field in a last LSU packet received in block 104 is configured as the valid value 1, and the synchronization completion flag of the Flag field in a remaining LSU packet received in block 104 is configured as the invalid value 0.

Similarly, for block 204:

if all of LSRs stored in the neighbor FC switch are carried in one LSU packet, the synchronization completion flag of the Flag field in the one LSU packet sent in block 204 is configured as the valid value 1;

if all of the LSRs stored in the neighbor FC switch are carried in a plurality of LSU packets, the synchronization completion flag of the Flag field in a last LSU packet sent in block 204 is configured as the valid value 1, and the synchronization completion flag of the Flag field in a remaining LSU packet sent in block 204 is configured as the invalid value 0.

In order to apply the method for synchronization after restart of a FC switch disclosed in the example of the present disclosure to a FC switch, a neighbor state machine in the FC switch is improved in accordance with an example of the present disclosure.

Figure 3:
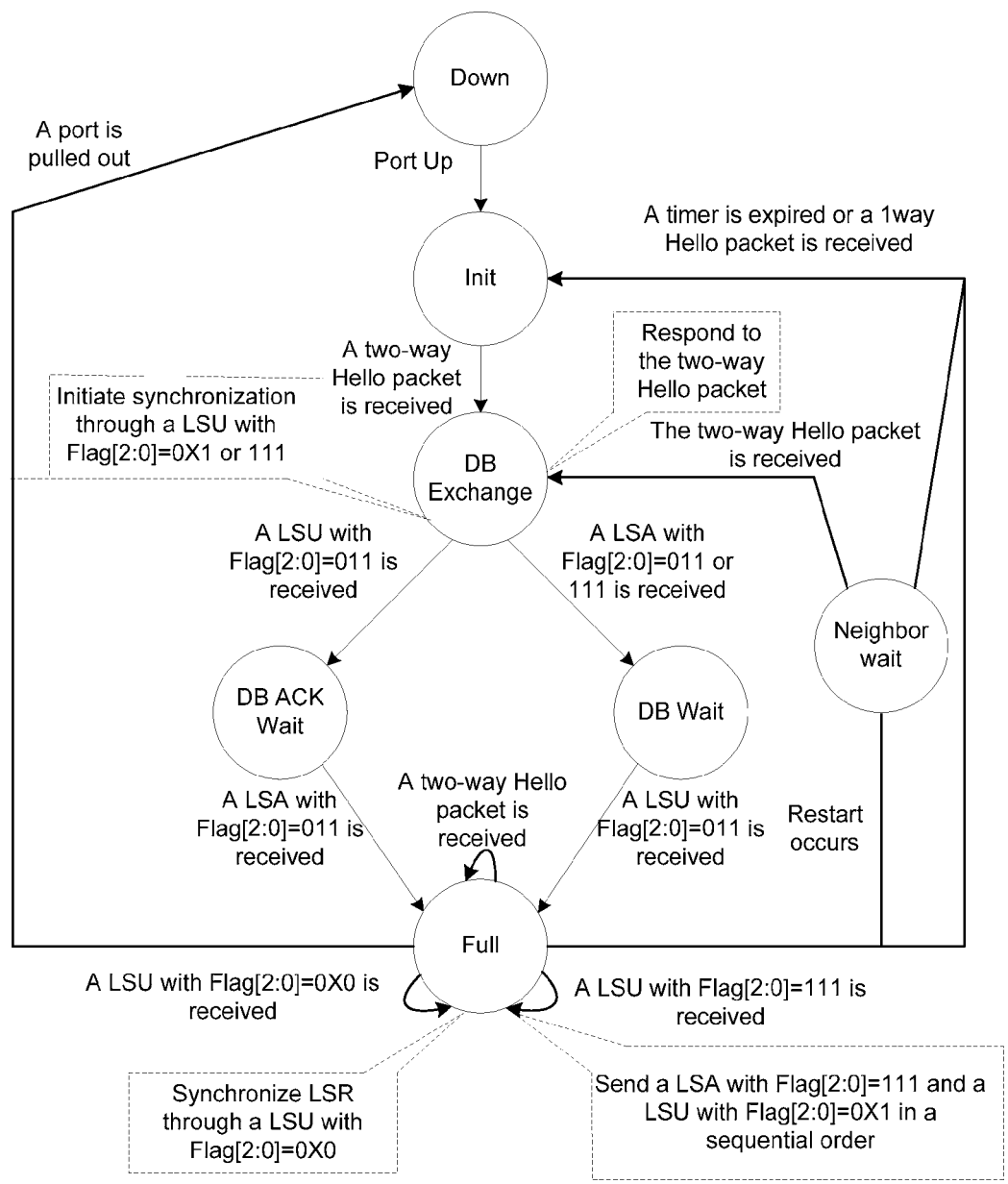
FIG. 3 is a schematic diagram illustrating a neighbor state machine according to an example of the present disclosure.

As shown in FIG. 3, the improved neighbor state machine includes Down state, Init state, DB Exchange state, DB Wait state, DB ACK Wait state and Full state, and Neighbor Wait state is further added in the neighbor state machine.

The neighbor state machine shown in FIG. 3 is described in detail hereinafter.

In Full state:

if a FC switch is restarted, a neighbor state machine of the FC switch is changed to Neighbor Wait state rather than changed to Down state in a conventional system, therefore, it can prevent the FC switch from immediately re-initiating a neighbor discovery process with a neighbor FC switch after the restart of the FC switch (i.e., changing from Down state to Init state, and sending a one-way HLO packet).

In Neighbor Wait state:

if a two-way HLO packet for keeping alive an adjacency relationship is not received from the neighbor FC switch within a predetermined waiting period, i.e., a timer is expired, it is determined and may be indicated that there is not a neighbor FC switch which has already established the adjacency relationship with the FC switch before the restart of the FC switch, therefore the FC switch may be rolled back to Init state to re-perform the neighbor discovery;

if a packet for neighbor discovery, e.g., a one-way HLO packet, is received from the neighbor FC switch within the predetermined waiting period, it is determined and may be indicated that the neighbor FC switch does not establish the adjacency relationship with the FC switch before the restart of the FC switch, or, the adjacency relationship is deleted at this time although the neighbor FC switch has established the adjacency relationship with the FC switch before the restart of the FC switch, therefore the FC switch may be rolled back to Init state to re-perform the neighbor discovery;

if the two-way HLO packet for keeping alive the adjacency relationship is received from the neighbor FC switch within the predetermined waiting period, it is determined and may be indicated that the neighbor FC switch has already established the adjacency relationship with the FC switch before the restart of the FC switch, and is in Full state, therefore the FC switch is changed to DB Exchange state.

In DB Exchange state:

if the FC switch is changed from Init state, the processing and changing approach is the same as conventional systems, except that the foregoing state non-change synchronization request flag is included in the Flag field of the LSU packet and the LSA packet, and is configured as an invalid value 0; in FIG. 3, if it is changed from Init state, a Flag field in an interactive LSU packet for LSR synchronization may be denoted as Flag[2:0]=0X1; the Flag field in a LSA packet sent from the neighbor FC switch and denoting that it is detected that the FC switch has completed the transmission of all LSRs, and the Flag field in a LSU packet sent from the neighbor FC switch and denoting that the neighbor FC switch has completed the transmission of all LSRs may be denoted as Flag[2:0]=011;

if the FC switch is changed from Neighbor Wait state, a two-way HLO packet for keeping alive the adjacency relationship is responded to the neighbor FC switch so as to begin maintenance of the adjacency relationship between the FC switch and the neighbor FC switch, and the neighbor state machine is kept in Full state; in addition, the FC switch transmits to the neighbor FC switch a LSU packet in which an initial synchronization flag requesting state non-change is carried (for example, when the neighbor FC switch is restarted), i.e., the LSU packet for initiating an initial synchronization request for keeping the adjacency relationship is transmitted, wherein in the Flag field of the LSU packet, the state non-change synchronization request flag is configured as the valid value 1, and the synchronization type flag is configured as the type value 1 which denotes initial synchronization; after the neighbor FC switch transmits a LSA packet in response to the LSU packet for initiating the initial synchronization request for keeping the adjacency relationship, the FC switch is changed to DB wait state; in FIG. 3, for a situation that the FC switch is changed from Neighbor Wait state, the Flag field in the LSU packet for initiating the initial synchronization request for keeping the adjacency relationship, and the Flag field in the LSA packet sent from the neighbor FC switch and in response to the LSU packet for initiating the initial synchronization request for keeping the adjacency relationship may be denoted as Flag[2:0]=111.

For a situation that it is changed from Neighbor Wait state to DB Exchange state, a FC switch in DB Exchange state may determine that the FC switch is in an adjacency relationship with a neighbor FC switch, or, the FC switch in DB Exchange state may determine that the FC switch is in a two-way relationship with the neighbor FC switch; no matter what case it is, the neighbor FC switch is kept in Full state and determines that the neighbor FC switch is in the adjacency relationship with the FC switch.

The above improvements are performed for a restarted FC switch. Accordingly, in the method for synchronization after restart of a FC switch shown in FIG. 1 in accordance with the example of the present disclosure, block 101 is performed when the FC switch is in Neighbor Wait state, blocks 102 and 103 are performed when the FC switch is in DB Exchange state, block 104 is performed when the FC switch is in DB Wait state, and the FC switch is changed to Full state after block 104 is completed.

In addition, in Full state:

if a LSU packet is received from a neighbor FC switch and an initial synchronization flag requesting state non-change is carried in the LSU packet (for example, when the neighbor FC switch is restarted), i.e., a FC switch receives the LSU packet sent from the neighbor FC switch and used for initiating an initial synchronization request for keeping an adjacency relationship, and an state non-change synchronization request flag included in a Flag field of the LSU packet is configured as a valid value 1, and a synchronization type flag included in the Flag field of the LSU packet is configured as a type value 1 denoting initial synchronization, the FC switch is kept in Full state, and transmits a LSA packet in response to the LSU packet sent from the neighbor FC switch and used for initiating the initial synchronization request for keeping the adjacency relationship, then synchronizes LSRs of the FC switch to the neighbor FC switch through a LSU packet for LSR synchronization, and receives a LSA packet sent from the neighbor FC switch and in response to the LSU packet for LSR synchronization; as such, it may be avoided that state rollback occurs in the FC switch when the neighbor FC switch is restarted; in FIG. 3, the Flag field in the LSU packet for initiating the initial request for keeping the adjacency relationship may be denoted as Flag[2:0]=111; the Flag field in the LSA packet in response to the LSU packet for initiating the initial synchronization request for keeping the adjacency relationship may be denoted as Flag[2:0]=111; the Flag field in the LSU packet for synchronizing LSRs to the neighbor FC switch may be denoted as Flag[2:0]=0X1.

The above improvements are performed for a neighbor FC switch of a restarted FC switch. Accordingly, in the method for synchronization after restart of a FC switch shown in FIG. 2 in accordance with the example of the present disclosure, blocks 201-204 are performed when the neighbor FC switch is in Full state.

The method for synchronization after restart of a FC switch in accordance with the example of the present disclosure is further described hereinafter with reference to an example.

Figure 4:
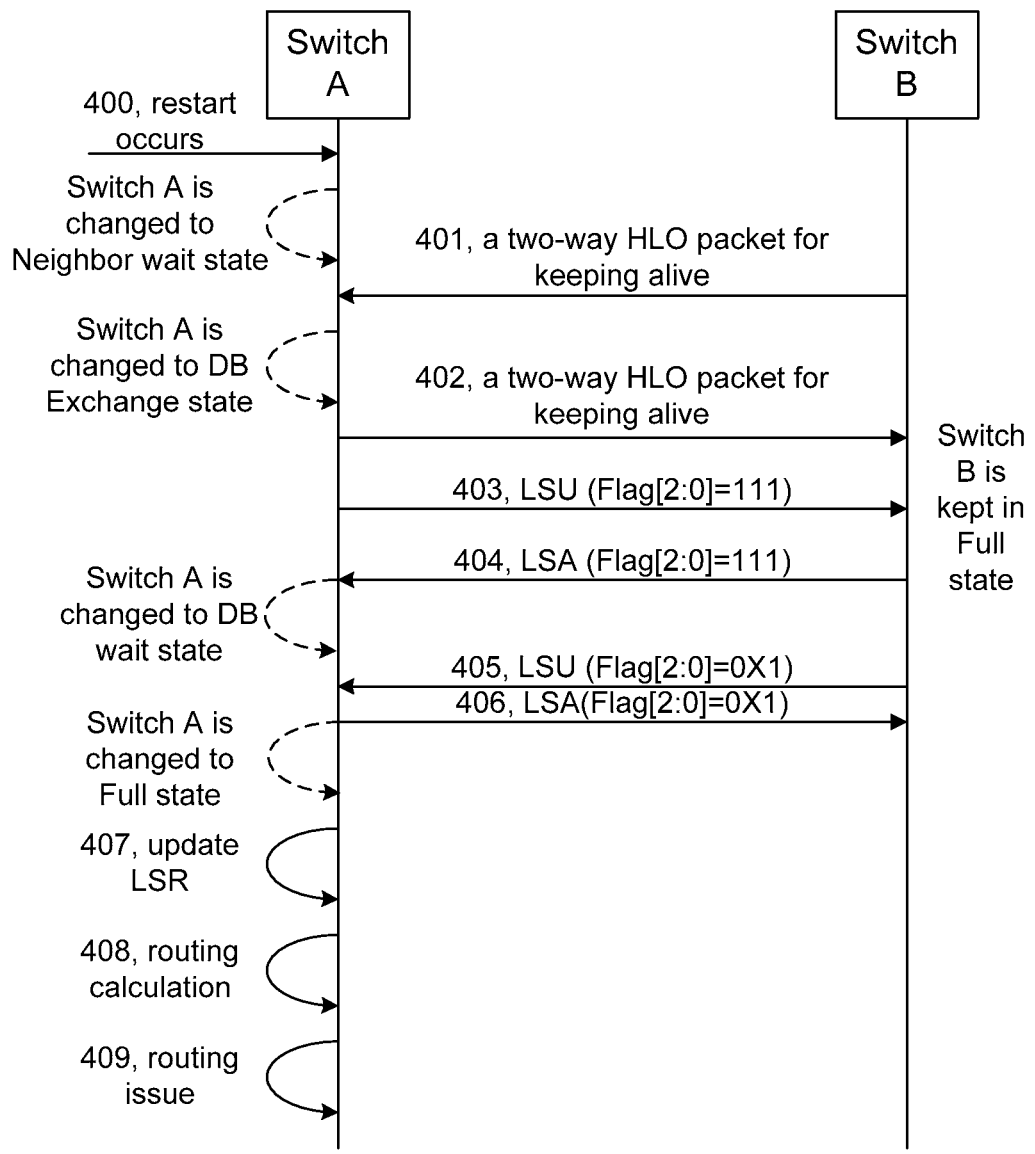
FIG. 4 is a flowchart illustrating an example of a method for synchronization after restart of a FC switch according to an example of the present disclosure.

FIG. 4 is a flowchart illustrating an example of a method for synchronization after restart of a FC switch according to an example of the present disclosure. As shown in FIG. 4, taking switch A and switch B which have established an adjacency relationship between each other as an example, switches A and B may be FC switches, or may be Fiber Channel over Ethernet (FCoE) switches. The flowchart includes operations as follows.

In block 400, switch A is restarted, and is changed from Full state to Neighbor Wait state; switch B is still in Full state.

In block 401, in order to maintain the adjacency relationship between switch A and switch B, switch B which is in Full state sends to switch A a two-way HLO packet for keeping alive the adjacency relationship; accordingly, switch A which is in Neighbor Wait state is able to receive the two-way HLO packet sent by switch B, and thus is able to determine that switch B has already established the adjacency relationship with switch A before the restart of switch A, and is changed to DB Exchange state.

In block 402, in order to avoid that state rollback occurs in switch B, switch A which is in DB Exchange state sends to switch B the two-way HLO packet for keeping alive the adjacency relationship; accordingly, switch B is able to receive the two-way HLO packet sent by switch A, and thus is able to continue keeping the adjacency relationship with switch A, and is still in Full state.

In block 403, switch A which is in DB Exchange state sends to switch B a LSU packet with Flag[2:0]=111 to request switch B to keep the adjacency relationship with switch A and perform LSR initial synchronization to switch A; accordingly, after receiving the LSU packet with Flag[2:0]=111 sent by switch A, switch B is still in Full state.

In block 404, in order to respond to the LSU packet sent by switch A and used for requesting switch B to keep the adjacency relationship with switch A and performing LSR initial synchronization to switch A, switch B which is in Full state sends to switch A a LSA packet with Flag[2:0]=111; accordingly, switch A is able to receive the LSA packet with Flag[2:0]=111 sent by switch B, and detect that switch B is about to synchronize LSRs to switch A; switch A is changed to DB Wait state.

In blocks 405-406, switch B which is in Full state sends to switch A a LSU packet with Flag[2:0]=0X1 in which all of LSRs stored in switch B are carried; accordingly, switch A which is in DB Wait state sends to switch B a LSA packet with Flag[2:0]=0X1 in response to each LSU packet carrying the LSR of switch B. The above operations are performed repeatedly until all LSRs in a LSDB of switch B are synchronized to switch A, and switch A is changed to Full state after the synchronization is completed.

In block 407, switch A which is in Full state updates locally stored LSRs to the synchronized LSRs received by switch A.

In block 408, switch A which is in Full state calculates routing of switch A.

In block 409, switch A which is in Full state issues the routing calculated by switch A.

So far, a synchronization recovery process after the restart of switch A is completed. After the process is completed, switch A is able to start routing forwarding; moreover, switch B is able to continue implementing the routing forwarding during the synchronization process.

The above is the description about the method for synchronization after restart of a FC switch in accordance with the example of the present disclosure. Based on the same principles as the method, an example of the present disclosure provides an apparatus for synchronization after restart of a FC switch.

An apparatus for synchronization after restart of a FC switch in accordance with an example of the present disclosure, which is applicable to the restarted FC switch, includes:

a neighbor waiting module, adapted to determine, when the FC switch is restarted and when a packet for keeping alive an adjacency relationship, e.g., a two-way HLO packet, is received from a neighbor FC switch within a predetermined waiting period, that the neighbor FC switch sending the two-way HLO packet has already established the adjacency relationship with the FC switch before the restart of the FC switch.

In practice, if the neighbor waiting module does not receive from the neighbor FC switch the two-way HLO packet for keeping alive the adjacency relationship within the predetermined waiting period (i.e., a timer for keeping alive the adjacency relationship is expired), it is determined and indicated that there is not a neighbor FC switch which has already established the adjacency relationship with the FC switch before the restart of the FC switch, so that the process of the apparatus is terminated, the adjacency relationship between the FC switch and the neighbor FC switch is deleted and a neighbor discovery process is re-performed with the neighbor FC switch by another module of the FC switch;

if the neighbor waiting module receives from the neighbor FC switch a packet for neighbor discovery within the predetermined waiting period (i.e., before the expiration of the timer for keeping alive the adjacency relationship), i.e., the neighbor discovery initiated by the neighbor FC switch is detected, it is determined and may be indicated that the neighbor FC switch does not establish the adjacency relationship with the FC switch before the restart of the FC switch, or, the adjacency relationship is deleted at this time although the neighbor FC switch has established the adjacency relationship with the FC switch before the restart of the FC switch, so that the process of the apparatus is terminated, the adjacency relationship between the FC switch and the neighbor FC switch is deleted and the neighbor discovery is re-performed with the neighbor FC switch through the other module of the FC switch.

A first neighbor maintaining module, adapted to respond to the neighbor FC switch a packet for keeping alive the adjacency relationship, e.g., the two-way HLO packet when the neighbor FC switch which has already established the adjacency relationship with the FC switch is detected.

A synchronization requesting module, adapted to send to the neighbor FC switch, after responding to the neighbor FC switch the two-way HLO packet for keeping alive the adjacency relationship, a LSU packet in which an initial synchronization flag requesting state non-change is carried to request the neighbor FC switch to keep the adjacency relationship with the FC switch as well as to perform LSR initial synchronization to the FC switch.

A synchronization receiving module, adapted to synchronize to the FC switch all LSRs carried in at least one LSU packet for LSR synchronization received from the neighbor FC switch when a LSA packet in response to the LSU packet sent by the synchronization requesting module of the apparatus and carrying the initial synchronization flag requesting state non-change is received from the neighbor FC switch which has already established the adjacency relationship with the FC switch; and trigger routing calculation after the synchronization is completed.

The above modules may be implemented by software (e.g. machine readable instructions stored in a memory and executable by a processor), hardware (e.g., the processor of an application specific integrated circuit (ASIC)), or a combination thereof.

An apparatus for synchronization after restart of a FC switch in accordance with another example of the present disclosure is applicable to a neighbor FC switch of the restarted FC switch, wherein the restarted FC switch has already established an adjacency relationship with the neighbor FC switch before the restart. The apparatus includes:

a second neighbor maintaining module, adapted to send a packet for keeping alive the adjacency relationship, e.g., a two-way HLO packet, to the restarted FC switch.

A local maintaining module, adapted to keep the adjacency relationship between the neighbor FC switch and the restarted FC switch when a two-way HLO packet for keeping alive the adjacency relationship is received from the restarted FC switch within a predetermined waiting period.

In practice, if the local maintaining module does not receive from the restarted FC switch the two-way HLO packet for keeping alive the adjacency relationship within the predetermined waiting period (i.e., a timer for keeping alive the adjacency relationship is expired), or, receives from the restarted FC a packet for neighbor discovery within the predetermined waiting period (i.e., before the expiration of the timer for keeping alive the adjacency), i.e., the neighbor discovery initiated by the restarted FC switch is detected, so that the process of the apparatus is terminated, the adjacency relationship between the neighbor FC switch and the restarted FC switch is deleted and the neighbor discovery is re-performed with the restarted FC switch by another module of the neighbor FC switch.

A synchronization responding module, adapted to keep, when a LSU packet is received from the restarted FC switch and it is detected that an initial synchronization flag requesting state non-change is carried in the received LSU packet, the adjacency relationship between the neighbor FC switch and the restarted FC switch, and respond to the restarted FC switch a LSA packet.

A synchronization sending module, adapted to send to the restarted FC switch, after the synchronization responding module responds the LSA packet to the restarted FC switch which sends the LSU packet carrying the initial synchronization flag requesting state non-change, all of LSRs stored in the neighbor FC switch through at least one LSU packet in which the LSRs are carried so as to synchronize with the restarted FC switch.

In addition, a Flag field in the above LSU packet and/or the LSA packet is the same as the method example described above, and is not repeated herein.

The above modules may be implemented by software (e.g. machine readable instructions stored in a memory and executable by a processor), hardware (e.g., the processor of an ASIC), or a combination thereof.

Figure 5:
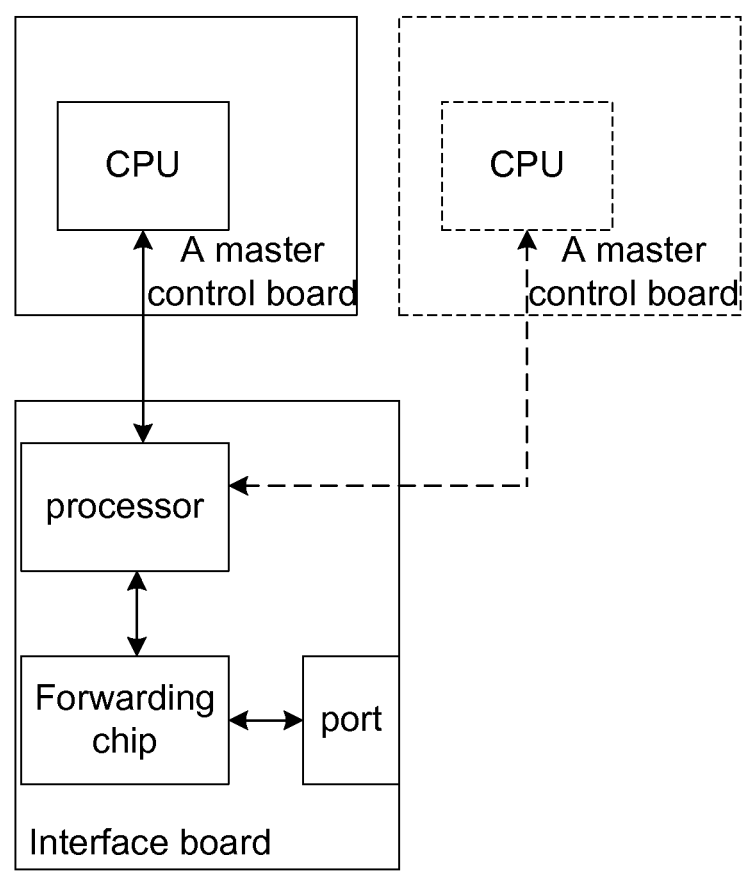
FIG. 5 is a schematic diagram illustrating a hardware structure according to an example of the present disclosure.

FIG. 5 is a schematic diagram illustrating a hardware structure according to an example of the present disclosure. As shown in FIG. 5, the hardware structure at least includes a master control board and an interface board, and may also include a backup master control board (shown with a dashed line in FIG. 5). The master control board is configured with a Central Processing Unit (CPU), which is used to implement various processes of the master control board, and implement a protocol layer for implementing routing calculation; the interface board is configured with a processor, a forwarding chip and a port, wherein the processor is used to implement various processes of the interface board, the forwarding chip is used to implement various processes of a hardware layer, and the port is used to implement interaction between a local and a neighbor FC switch.

In the hardware structure shown in FIG. 5, the CPU of the master control board may perform the method for synchronization after restart of a FC switch in accordance with the example of the present disclosure, or, include the apparatus for synchronization after restart of a FC switch in accordance with the example of the present disclosure.

Figure 6A:
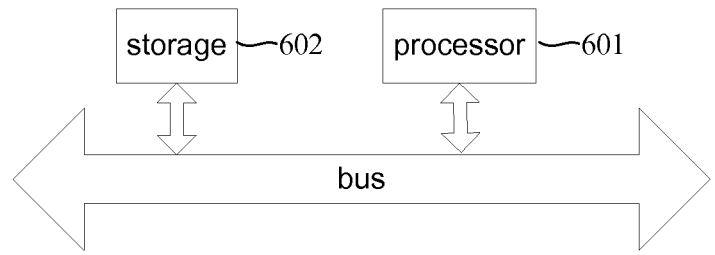
FIG. 6A is a schematic diagram illustrating a hardware structure of an apparatus for synchronization after restart of a FC switch according to an example of the present disclosure.

FIG. 6A is a schematic diagram illustrating a hardware structure of an apparatus for synchronization after restart of a FC switch according to an example of the present disclosure. The apparatus is applicable to the restarted FC switch, and includes processor 601 and storage 602, wherein, storage 602 is adapted to store machine readable instructions; and processor 601 is adapted to execute the machine readable instructions to perform operations including:

when the apparatus is restarted and when a packet for keeping alive an adjacency relationship, e.g., a two-way HLO packet, is received within a predetermined waiting period, determining that a neighbor FC switch sending the two-way HLO packet has already established the adjacency relationship with the apparatus before the restart of the apparatus;

when the neighbor FC switch which has already established the adjacency relationship with the apparatus is detected, responding to the neighbor FC switch a packet for keeping alive the adjacency relationship, e.g., the two-way HLO packet;

after responding to the neighbor FC switch the two-way HLO packet for keeping alive the adjacency relationship, sending to the neighbor FC switch a LSU packet in which an initial synchronization flag requesting state non-change is carried to request the neighbor FC switch to keep the adjacency relationship with the apparatus as well as to perform LSR initial synchronization to the apparatus;

when a LSA packet in response to the LSU packet sent by the apparatus and carrying the initial synchronization flag requesting state non-change is received from the neighbor FC switch which has already established the adjacency relationship with the apparatus, synchronizing all LSRs carried in at least one LSU packet for LSR synchronization received from the neighbor FC switch to the apparatus; and triggering a routing calculation after the synchronization is completed.

Furthermore, a Flag field is included in the LSU packet, wherein the Flag field includes a state non-change synchronization request flag and a synchronization type flag. In the Flag field of the LSU packet sent to the neighbor FC switch and carrying the initial synchronization flag requesting state non-change, the state non-change synchronization request flag may be configured as a valid value, e.g., 1; and the synchronization type flag may be configured as a type value denoting initial synchronization, e.g., 1;

in the Flag field of the at least one LSU packet received from the neighbor FC switch and used for LSR synchronization, the state non-change synchronization request flag may be configured as an invalid value, e.g., 0; and the synchronization type flag may be configured as the type value denoting initial synchronization.

The Flag field further includes a synchronization completion flag, wherein, in the Flag field of the LSU packet sent to the neighbor FC switch and carrying the initial synchronization flag requesting state non-change, the synchronization completion flag may be configured as a valid value, e.g., 1;

if all of the LSRs stored in the neighbor FC switch are carried in one LSU packet used for LSR synchronization, the synchronization completion flag of the Flag field in the one LSU packet used for LSR synchronization and received from the neighbor FC switch may be configured as the valid value;

if all of the LSRs stored in the neighbor FC switch are carried in a plurality of LSU packets used for LSR synchronization, the synchronization completion flag of the Flag field in a last LSU packet used for LSR synchronization and received from the neighbor FC switch may be configured as the valid value, and the synchronization completion flag of the Flag field in a remaining LSU packet used for LSR synchronization and received from the neighbor FC switch may be configured as the invalid value, e.g., 0.

Figure 6B:
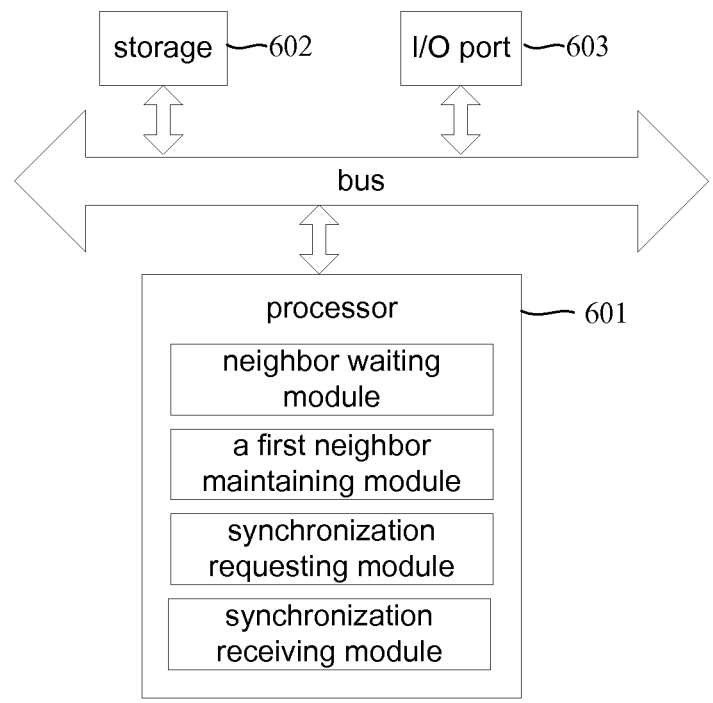
FIG. 6B is a schematic diagram illustrating a hardware structure of an apparatus for synchronization after restart of a FC switch according to an example of the present disclosure.

As can be seen from the above description, when the machine readable instruction stored in storage 602 are executed by processor 601, functions of the foregoing neighbor waiting module, the first neighbor maintaining module, the synchronization requesting module and the synchronization receiving module are implemented. Therefore, the hardware structure of the apparatus for synchronization after restart of a FC switch shown in FIG. 6A may also be shown in FIG. 6B, wherein the apparatus shown in FIG. 6B further includes I/O port 603.

Figure 7A:
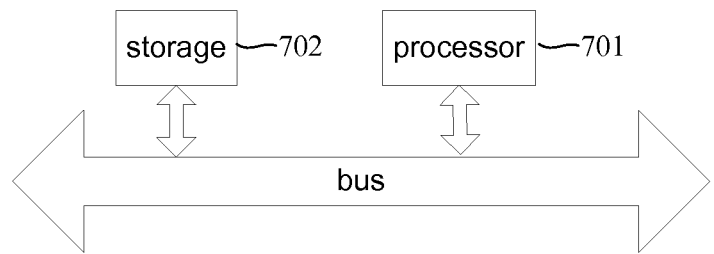
FIG. 7A is a schematic diagram illustrating a hardware structure of another apparatus for synchronization after restart of a FC switch according to an example of the present disclosure.

FIG. 7A is a schematic diagram illustrating a hardware structure of another apparatus for synchronization after restart of a FC switch according to an example of the present disclosure. The apparatus is applicable to a neighbor FC switch of the restarted FC switch, wherein the restarted FC switch has already established an adjacency relationship with the neighbor FC switch before the restart. The apparatus includes processor 701 and storage 702, wherein, storage 702 is adapted to store machine readable instructions; and processor 701 is adapted to execute the machine readable instructions to perform operations including:

sending to the restarted FC switch a packet for keeping alive the adjacency relationship, e.g., a two-way HLO packet;

if a two-way HLO packet for keeping alive the adjacency relationship is received from the restarted FC switch within a predetermined waiting period, keeping the adjacency relationship between the apparatus and the restarted FC switch;

when a LSU packet is received from the restarted FC switch and it is detected that an initial synchronization flag requesting state non-change is carried in the received LSU packet, keeping the adjacency relationship between the apparatus and the restarted FC switch, and responding to the restarted FC switch a LSA packet;

after the LSA packet is responded to the restarted FC switch which sends the LSU packet carrying the initial synchronization flag requesting state non-change, sending to the restarted FC switch all of LSRs stored in the apparatus through at least one LSU packet in which all of the LSRs are carried so as to synchronize with the restarted FC switch.

Furthermore, a Flag field is included in the LSU packet, wherein the Flag field includes a state non-change synchronization request flag and a synchronization type flag. In the Flag field of the LSU packet received from the neighbor FC switch and carrying the initial synchronization flag requesting state non-change, the state non-change synchronization request flag may be configured as a valid value, e.g., 1; and the synchronization type flag may be configured as a type value denoting initial synchronization, e.g., 1;

in the Flag field of the at least one LSU packet sent to the neighbor FC switch and used for LSR synchronization, the state non-change synchronization request flag may be configured as an invalid value, e.g., 0; and the synchronization type flag may be configured as the type value denoting initial synchronization.

The Flag field further includes a synchronization completion flag, wherein, in the Flag field of the LSU packet received from the neighbor FC switch and carrying the initial synchronization flag requesting state non-change, the synchronization completion flag may be configured as a valid value, e.g., 1;

if all of the LSRs stored in the apparatus are carried in one LSU packet used for LSR synchronization, the synchronization completion flag of the Flag field in the one LSU packet used for LSR synchronization and sent to the neighbor FC switch may be configured as the valid value;

if all of the LSRs stored in the apparatus are carried in a plurality of LSU packets used for LSR synchronization, the synchronization completion flag of the Flag field in a last LSU packet used for LSR synchronization and sent to the neighbor FC switch may be configured as the valid value, and the synchronization completion flag of the Flag field in a remaining LSU packet used for LSR synchronization and sent to the neighbor FC switch may be configured as an invalid value, e.g., 0.

Figure 7B:
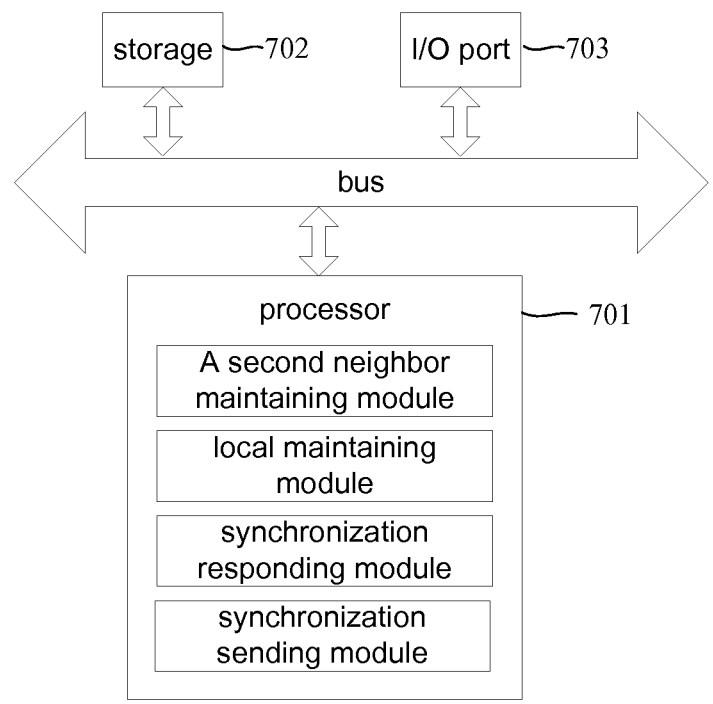
FIG. 7B is a schematic diagram illustrating a hardware structure of another apparatus for synchronization after restart of a FC switch according to an example of the present disclosure.

As can be seen from the above description, when the machine readable instruction stored in storage 702 are executed by processor 701, functions of the foregoing second neighbor maintaining module, the local maintaining module, the synchronization responding module and the synchronization sending module are implemented. Therefore, the hardware structure of the apparatus for synchronization after restart of a FC switch shown in FIG. 7A may be also shown in FIG. 7B, wherein the apparatus shown in FIG. 7B further includes I/O port 703.

As can be seen from the above technical solution, in the examples of the present disclosure, when a FC switch which is restarted detects that a neighbor FC switch has already established an adjacency relationship with the restarted FC switch, the adjacency relationship between the restarted FC switch and the neighbor FC switch is maintained immediately, and the neighbor FC switch is requested to perform LSR initial synchronization to the restarted FC switch under a circumstance that the adjacency relationship is kept. As such, state rollback occurring in the neighbor FC switch can be avoided and deletion of the adjacency relationship between the neighbor FC switch and the restarted FC switch can be avoided. Therefore, the routing from another FC switch in a FC network to the restarted FC switch through the neighbor switch FC being deleted can be avoided, so that the routing from the other FC switch in the FC network to the restarted FC switch is not changed before and after the restart of the restarted FC switch;

in addition, the restarted FC switch is capable of detecting the same LSRs as ones before the restart of the restarted FC switch through the LSR initial synchronization, therefore routing from the restarted FC switch to the other FC switch in the FC network which is re-calculated by the restarted FC switch is the same as one before the restart of the restarted FC switch; moreover, the restarted FC switch triggers routing calculation after the initial synchronization is completed rather than performs the routing calculation during the process of the initial synchronization. Therefore, frequent changing of the routing from the restarted FC switch to the other FC switch in the FC network which is re-calculated by the restarted FC switch following the process of the initial synchronization can be avoided. Therefore, a change in the routing in the FC network due to the restart of the FC switch can be avoided.

The above examples can be implemented by hardware, software or firmware or a combination thereof. For example the various methods, processes and functional units described herein may be implemented by a processor (the term processor is to be interpreted broadly to include a CPU, processing unit, ASIC, logic unit, or programmable gate array etc.). The processes, methods and functional units may all be performed by a single processor or split between several processors; reference in this disclosure or the claims to a 'processor' should thus be interpreted to mean 'one or more processors'. The processes, methods and functional units be implemented as machine readable instructions executable by one or more processors, hardware logic circuitry of the one or more processors or a combination thereof. Further the teachings herein may be implemented in the form of a software product. The computer software product is stored in a non-transitory storage medium and comprises a plurality of instructions for making a computer apparatus (which can be a personal computer, a server or a network apparatus such as a router, switch, access point etc.) implement the method recited in the examples of the present disclosure.

The figures are only illustrations of examples, wherein the units or procedure shown in the figures are not necessarily essential for implementing the present disclosure. The units in the aforesaid examples can be combined into one unit or further divided into a plurality of sub-units.

The above are just several examples of the present disclosure, and are not used for limiting the protection scope of the present disclosure. Any modifications, equivalents, improvements, etc., made under the principle of the present disclosure should be included in the protection scope of the present disclosure.

What is claimed is:

1. A method for synchronization after restart of a Fiber Channel (FC) switch, wherein the method is applied at a first FC switch which is restarted; the method comprising:
when the first FC switch is restarted and a first packet for keeping alive an adjacency relationship is received from a second FC switch within a predetermined waiting period, the first FC Switch determining that the second FC switch which sends the first packet has already established the adjacency relationship with the first FC switch before the restart of the first FC switch;
the first FC switch responding to the second FC switch with a second packet for keeping alive the adjacency relationship;
under a circumstance that the adjacency relationship is kept, the first FC switch sending to the second FC switch a Link State Update (LSU) packet in which an initial synchronization flag requesting state non-change is carried to request the second FC switch to keep the adjacency relationship with the first FC switch and to perform Link State Record (LSR) initial synchronization;
when a Link State Acknowledgement (LSA) packet in response to the LSU packet sent by the first FC switch and carrying the initial synchronization flag requesting state non-change is received from the second FC switch, the first FC switch synchronizing all of LSRs carried in at least one LSU packet for LSR synchronization received from the second FC switch to the first FC switch; and
the first FC switch triggering routing calculation after the LSR initial synchronization is completed.

2. The method of claim 1, wherein the LSU packet comprises a Flag field including a state non-change synchronization request flag and a synchronization type flag, wherein,
in the Flag field of the LSU packet sent to the second FC switch and carrying the initial synchronization flag requesting state non-change, the state non-change synchronization request flag is configured as a valid value, and the synchronization type flag is configured as a type value denoting initial synchronization; and
in the Flag field of the at least one LSU packet received from the second FC switch and used for LSR synchronization, the state non-change synchronization request flag is configured as an invalid value, and the synchronization type flag is configured as the type value denoting initial synchronization.

3. The method of claim 2, wherein the Flag field further comprises a synchronization completion flag, wherein,
in the Flag field of the LSU packet sent to the second FC switch and carrying the initial synchronization flag requesting state non-change, the synchronization completion flag is configured as the valid value;
if all of the LSRs of the second FC switch are carried in one LSU packet used for LSR synchronization, the synchronization completion flag of the Flag field in the one LSU packet used for LSR synchronization and received from the second FC switch is configured as the valid value; and
if all of the LSRs of the second FC switch are carried in a plurality of LSU packets used for LSR synchronization, the synchronization completion flag of the Flag field in a last LSU packet used for LSR synchronization and received from the second FC switch is configured as the valid value, and the synchronization completion flag of the Flag field in a remaining LSU packet used for LSR synchronization and received from the second FC switch is configured as the invalid value.

4. A method for synchronization after restart of a Fiber Channel (FC) switch, wherein the method is applied at a neighbor FC switch of a first FC switch which is restarted, and the first FC switch has already established an adjacency relationship with the neighbor FC switch before the restart of the first FC switch; the method comprising:
the second FC switch sending to the first FC switch a first packet for keeping alive the adjacency relationship after the first FC switch is restarted;
if a second packet for keeping alive the adjacency relationship is received from the first FC switch within a predetermined waiting period, the second FC switch keeping the adjacency relationship with the first FC switch;
under a circumstance that the adjacency relationship is kept, the second FC switch responding to the first FC switch with a Link State Acknowledgement (LSA) packet when a Link State Update (LSU) packet is received from the first FC switch and it is detected that an initial synchronization flag requesting state non-change is carried in the received LSU packet; and
the second FC switch sending to the first FC switch all of LSRs stored in the neighbor FC switch through at least one LSU packet in which all of the LSRs are carried so as to synchronize with the first FC switch.

5. The method of claim 4, wherein the LSU packet comprises a Flag field including a state non-change synchronization request flag and a synchronization type flag, wherein,
in the Flag field of the LSU packet received from the first FC switch and carrying the initial synchronization flag requesting state non-change, the state non-change synchronization request flag is configured as a valid value, and the synchronization type flag is configured as a type value denoting initial synchronization; and
in the Flag field of the at least one LSU packet sent to the first FC switch and used for LSR synchronization, the state non-change synchronization request flag is configured as an invalid value, and the synchronization type flag is configured as the type value denoting initial synchronization.

6. The method of claim 5, wherein the Flag field further comprises a synchronization completion flag, wherein,
in the Flag field of the LSU packet received from the first FC switch and carrying the initial synchronization flag requesting state non-change, the synchronization completion flag is configured as the valid value;

if all of the LSRs stored in the neighbor FC switch are carried in one LSU packet used for LSR synchronization, the synchronization completion flag of the Flag field in the one LSU packet used for LSR synchronization and sent to the first FC switch is configured as the valid value; and if all of the LSRs stored in the neighbor FC switch are carried in a plurality of LSU packets used for LSR synchronization, the synchronization completion flag of the Flag field in a last LSU packet used for LSR synchronization and sent to the first FC switch is configured as the valid value, and the synchronization completion flag of the Flag field in a remaining LSU packet used for LSR synchronization and sent to the first FC switch is configured as the invalid value.

7. A first Fiber Channel (FC) switch, comprising a processor and a storage, wherein,
the storage is to store machine readable instructions; and
the processor is to execute the machine readable instructions to perform operations including:
when the first FC switch is restarted and a first packet for keeping alive an adjacency relationship is received from a second FC switch within a predetermined waiting period, determining that the second FC switch which sends the first packet has already established the adjacency relationship with the first FC switch before the restart of the first FC switch;
responding to the second FC switch with a second packet for keeping alive the adjacency relationship;
under a circumstance that the adjacency relationship is kept, sending to the second FC switch a Link State Update (LSU) packet in which an initial synchronization flag requesting state non-change is carried to request the second FC switch to keep the adjacency relationship with the first FC switch and to perform Link State Record (LSR) initial synchronization to the first FC switch;
when a Link State Acknowledgement (LSA) packet in response to the LSU packet sent by the first FC switch and carrying the initial synchronization flag requesting state non-change is received from the second FC switch, synchronizing all of LSRs carried in at least one LSU packet for LSR synchronization received from the second FC switch to the first FC switch; and
triggering routing calculation after the LSR initial synchronization is completed.

8. The first FC switch of claim 7, wherein the LSU packet comprises a Flag field including a state non-change synchronization request flag and a synchronization type flag, wherein,
in the Flag field of the LSU packet sent to the second FC switch and carrying the initial synchronization flag requesting state non-change, the state non-change synchronization request flag is configured as a valid value, and the synchronization type flag is configured as a type value denoting initial synchronization; and
in the Flag field of the at least one LSU packet received from the second FC switch and used for LSR synchronization, the state non-change synchronization request flag is configured as an invalid value, and the synchronization type flag is configured as the type value denoting initial synchronization.

9. The first FC switch of claim 8, wherein the Flag field further comprises a synchronization completion flag, wherein,
in the Flag field of the LSU packet sent to the second FC switch and carrying the initial synchronization flag requesting state non-change, the synchronization completion flag is configured as the valid value;

if all of the LSRs of the second FC switch are carried in one LSU packet used for LSR synchronization, the synchronization completion flag of the Flag field in the one LSU packet used for LSR synchronization and received from the second FC switch is configured as the valid value; and if all of the LSRs of the second FC switch are carried in a plurality of LSU packets used for LSR synchronization, the synchronization completion flag of the Flag field in a last LSU packet used for LSR synchronization and received from the second FC switch is configured as the valid value, and the synchronization completion flag of the Flag field in a remaining LSU packet used for LSR synchronization and received from the second FC switch is configured as the invalid value.

10. A neighbor Fiber Channel (FC) switch, wherein the neighbor FC switch is a neighbor of a first FC switch which is restarted, and the first FC switch has already established an adjacency relationship with the neighbor FC switch before the restart of the first FC switch, the neighbor FC switch comprising a processor and a storage, wherein,
the storage is to store machine readable instructions; and
the processor is to execute the machine readable instructions to perform operations including:
sending to the first FC switch a first packet for keeping alive the adjacency relationship after the first FC switch is restarted;
if a second packet for keeping alive the adjacency relationship is received from the first FC switch within a predetermined waiting period, keeping the adjacency relationship with the first FC switch;
under a circumstance that the adjacency relationship is kept, responding to the first FC switch with a Link State Acknowledgement (LSA) packet when a Link State Update (LSU) packet is received from the first FC switch and it is detected that an initial synchronization flag requesting state non-change is carried in the received LSU packet; and
sending to the first FC switch all of locally stored LSRs through at least one LSU packet in which all of the LSRs are carried so as to synchronize with the first FC switch.

11. The neighbor FC switch of claim 10, wherein the LSU packet comprises a Flag field including a state non-change synchronization request flag and a synchronization type flag, wherein,
in the Flag field of the LSU packet received from the first FC switch and carrying the initial synchronization flag requesting state non-change, the state non-change synchronization request flag is configured as a valid value, and the synchronization type flag is configured as a type value denoting initial synchronization;
in the Flag field of the at least one LSU packet sent to the first FC switch and used for LSR synchronization, the state non-change synchronization request flag is configured as an invalid value, and the synchronization type flag is configured as the type value denoting initial synchronization;
wherein the Flag field further comprises a synchronization completion flag, wherein,
in the Flag field of the LSU packet received from the first FC switch and carrying the initial synchronization flag requesting state non-change, the synchronization completion flag is configured as the valid value;

if all of the locally stored LSRs are carried in one LSU packet used for LSR synchronization, the synchronization completion flag of the Flag field in the one LSU packet used for LSR synchronization and sent to the first FC switch is configured as the valid value; and if all of the locally stored LSRs are carried in a plurality of LSU packets used for LSR synchronization, the synchronization completion flag of the Flag field in a last LSU packet used for LSR synchronization and sent to the first FC switch is configured as the valid value, and the synchronization completion flag of the Flag field in a remaining LSU packet used for LSR synchronization and sent to the first FC switch is configured as the invalid value.

* * * * *